United States Patent Office 2,756,500
Patented July 31, 1956

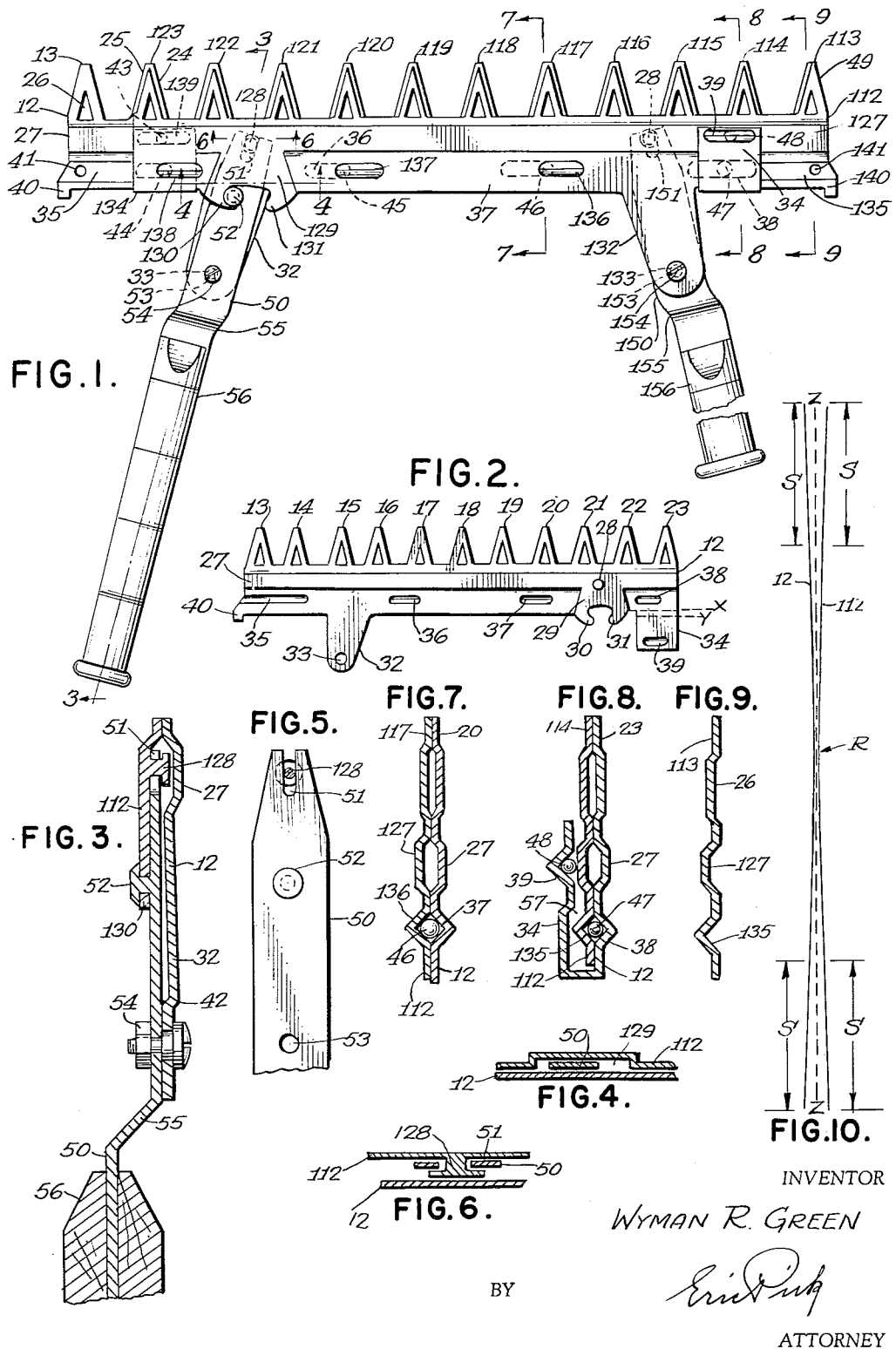

2,756,500
MULTIBLADE HEDGE TRIMMER

Wyman R. Green, Madison, N. J.

Application May 13, 1953, Serial No. 354,707

7 Claims. (Cl. 30—211)

This invention relates to hedge trimmers of the multi-blade type as more fully set forth hereinafter and as claimed.

One of the objects of my invention is to provide a hedge trimmer that is light in weight, simple in construction, effective in operation, and that can be produced inexpensively;

Another object is to provide a hedge trimmer which employs two cutter bars of like shape;

A further object is to provide a hedge trimmer in which the manual force applied in its operation is multipled by simple leverage, and which has a center of gravity close to the line connecting the points at which the manual force is applied so as to reduce the operator's effort to a minimum;

Another object is to provide a hedge trimmer with cutter bars which, although made of relatively thin metal, are stiff and in firm contact with each other along their entire length;

A further object is to provide a hedge trimmer in which friction is reduced to a minimum;

Still another object of my invention is to provide a multi-blade hedge trimmer that in its simplest form consists of a minimum number of parts: two similar cutter bars, two similar operating levers, and a number of minor small parts.

The manner in which these and other objects are achieved is described in the following specification and illustrated in the accompanying drawings in which:

Fig. 1 is a view of a hedge trimmer according to my invention;

Fig. 2 is a view of the lower cutter bar 12 of Fig. 1 on a smaller scale;

Figs. 3 and 4 are fragmentary views on an enlarged scale, partly in section along lines 3—3 and 4—4, respectively, of Fig. 1;

Fig. 5 is a fragmentary view of operating lever 50 of Fig. 1;

Figs. 6, 7, 8, and 9 are fragmentary views on an enlarged scale, in cross section along lines 6—6, 7—7, 8—8, and 9—9, respectively, of Fig. 1; and Fig. 10 is a diagrammatic view illustrating the curvature of the cutter bars 12 and 112 of Fig. 1.

Like numerals refer to like parts throughout the several views.

Referring now to Fig. 1, my hedge trimmer comprises two cutter bars 12 and 112 which are of like shape, and one of which is shown by itself in Fig. 2 prior to bending the tab 34. Each of the cutter bars 12 and 112 has on one side thereof a plurality of knives 13 to 23 and 113 to 123, respectively. The knives are advantageously formed integral with the cutter bars and each has two cutting edges as shown at 24 and 25 on the knife 123 in Fig. 1, except that knives 13 and 113 need not have cutting edges on their outer edges, as indicated at 49 on knife 113. Each knife is advantageously provided with a relief cavity as shown at 26 on knife 13 of Fig. 1; such a relief cavity 26 is also shown in Fig. 9. Each cutter bar has a longitudinal offset bend 27 and 127, respectively, serving to reduce the surface contact between the cutter bars and to make them more rigid. On the cutter bars 12 and 112 there is provided a stud 28 and 128, respectively, and a recess such as shown at 129 formed as extension of the respective offset bends 27 and 127. The cutter bar 12 has two hook-shaped stops 30 and 31 and the cutter bar 112 has similar stops 130 and 131. The cutter bar 12 has a projection 32 with an opening 33 therein and the cutter bar 112 has a similar projection 132 with an opening 133. Each of the cutter bars has a tab 34 and 134, respectively. Referring to Fig. 2, the tab is bent along the broken lines X and Y so as to form a channel 57 between the tab and the main portion of the cutter bar, in which channel the other of said cutter bars is adapted to slide as shown in Fig. 8. The cutter bar 12 has cavities 35, 36, 37, 38, and 39 and the cutter bar 112 has similar cavities 135, 136, 137, 138, and 139. At the end of each cutter bar is a nib 40 and 140, respectively. Each cutter bar has, near one end, a hole 41 and 141, respectively, which serves for hanging the hedge trimmer on a hook or nail when not in use. The projections 32 and 132 are advantageously provided with a slight offset as indicated at 42 in Fig. 3 to reduce the areas in frictional contact.

In the assembled hedge trimmer anti-friction balls 43 to 48 inclusive are provided as follows: ball 43 in cavity 139; ball 44 in cavities 35 and 138; ball 45 in cavities 36 and 137; ball 46 in cavities 37 and 136; ball 47 in cavities 38 and 135; and ball 48 in cavity 39.

My hedge trimmer has furthermore two similar operating levers 50 and 150 each having a forked tip 51 and 151, respectively, a stud or projection such as shown at 52, Fig. 1, on lever 50, and a bearing opening 53 and 153, respectively. A shoulder screw with nut 54 is placed in the opening 33 and the bearing opening 53 and a similar shoulder screw 154 is placed in the opening 133 and bearing opening 153. Each of the operating levers 50 and 150 has, preferably, an offset bend as indicated at 55 and 155, respectively, and is provided with the respective handgrips 56 and 156 which may be made of wood or a suitable plastic.

The cutter bars 12 and 112 are advantageously made with a curvature so that they present to each other longitudinally convex faces which are straightened out by the force exerted by the tabs 34 and 134 in the assembled hedge trimmer. This insures that the knives on one cutter bar will contact the knives on the other cutter bar, thereby insuring effective cutting action without pinching. Fig. 10 indicates diagrammatically the preferred curvature of the cutter bars, the broken line Z—Z indicating how they become straight in the assembled trimmer. Each of the cutter bars has a central portion of 50 to 70 per cent of its length bent to a curvature with a radius R of 5 to 10 times the length of said cutter bar. Each cutter bar also has at each end a straight portion S extending 15 to 25 per cent of its length. For example, satisfactory results were obtained with a cutter bar 17 inches long which had at each end a straight portion 3 to 4 inches long and which had a central portion 10 inches long and bent to a curvature with a radius of 15 feet.

In assembling the hedge trimmer the balls 45 and 46 are placed in the cavities 36 and 37, respectively, of the lower cutter bar 12; the upper cutter bar 112 is then laid over them and the two bars are pushed together, the right end of the upper bar 112 being thrust into the channel 57 between the tab 34 and the cutter bar 12 to which said tab is attached, and the left end of the lower bar 12 being thrust into the channel between the tab 134 and the bar 112. When the said ends of the cutter bars 112 and 12 have reached the middle of the tabs 34 and 134, respectively, the balls 43 and 48 are forced into the cavities 139 and 39, respectively. Similarly at this time balls 44 and 47 are placed in their locations between cavities 35 and 138, and between cavities 38 and 135, respectively. As the cutter bars 12 and 112 are being pushed together the bars are being held apart in their middle portions by half the diameter of the balls 45 and 46 until the cavities in the two bars begin to overlap each other, at which moment the bars will snap together with the balls in their correct positions. Thereupon the operating lever 50 is placed into the recess 129 between the two cutter bars so that the forked tip 51 engages the stud 128. Then the shoulder screw 54 is placed into the opening 33 and the bearing opening 53. The operating lever 150 is similarly inserted into the recess 29 between the two cutter bars with the forked tip 151 engaging stud 28, and the shoulder screw 154 is then placed into openings 133 and 153.

In operation, the operator holds the handgrips 56 and 156, moving them alternately towards each other and away from each other while at the same time advancing along the hedge or other growth that is to be trimmed. On pushing the grips 56 and 156 towards each other the cutter bars 12 and 112 slide over each other until knife 13 comes opposite knife 123, knife 14 comes opposite knife 122, and so forth. On pulling the grips 56 and 156 apart from each other to the position illustrated in Fig. 1, the cutter bars slide until knife 14 comes opposite knife 123, knife 15 opposite knife 122, and so forth. There is thus a shearing action during each stroke and a hedge can be trimmed quickly and effectively by advancing the hedge trimmer along it while at the same time moving the levers to and fro.

One particular feature of my hedge trimmer is that fragments of vegetation cannot easily get between the cutter bars or into the cavities for the balls where they would cause excessive resistance to free cutting action.

Means are provided for limiting the sliding movement of each of said cutter bars relative to the other in the assembled hedge trimmer. These means comprise the stud or projection 52 on lever 50 alternately engaging the hook-shaped stops 130 and 131, and the corresponding projection on lever 150 engaging the stops 30 and 31. Also, when the levers are being pushed toward each other the tab 134 engages the nib 40, and the tab 34 engages the nib 140; on being pushed away from each other the projection 32 strikes the tab 134 whereas the projection 132 strikes the tab 34. It is to be understood that only one type of movement-limiting means need be employed although two types have been shown in Fig. 1. Thus, either the projections 52, 152 and the hooks 30, 31, 130 and 131 may be omitted, or else the nibs 40 and 140 may be omitted. Actually, movement-limiting means are necessary on one cutter bar only, but in order to make both cutter bars alike for economy in manufacture it is more convenient to provide such means on both cutter bars.

The cutter bars and levers of my hedge trimmer can be made from flat sheet steel. This makes for low weight and low manufacturing cost. The cutter bars must, of course, be hardened after manufacture to provide cutting edges (such as 24 and 25) which will remain sharp for a satisfactorily long period of time. If the knives become dull after prolonged use, they can readily be filed and stoned to make them sharp again without need for taking the hedge trimmer apart.

While I have shown and described what I consider the preferred embodiment of my invention, modifications may be made without departing from its spirit and reference is therefore made to the appended claims for a definition of the scope of this invention.

What I claim is:

1. A hedge trimmer comprising two similar juxtaposed oblong cutter bars in sliding engagement with each other, each cutter bar being provided with a plurality of cutting knives on one long edge thereof, a projection near one short edge thereof, and tab means extending from the other long edge thereof, each of said tab means being bent to form a channel with its cutter bar in which channel the other of said cutter bars is adapted to slide, each cutter bar also having a stud adjacent to the other short edge thereof, and a pair of similar operating levers each having a forked tip inserted between said cutter bars and engaging one of said studs, each operating lever being fulcrumed on one of said projections.

2. In the combination of claim 1, each of said cutter bars being made from flat sheet steel, cavities press-formed in each of said cutter bars, and balls located in said cavities.

3. In the combination of claim 1, each of said cutter bars being made with longitudinally convex faces, said convex faces facing each other and being straightened out by the force exerted by said tabs in the assembled hedge trimmer.

4. In the combination of claim 1, each of said cutter bars having a central portion of 50 to 70 per cent of its length bent to a curvature with a radius of 5 to 10 times the length of said cutter bar, each cutter bar also having at each end a straight portion extending 15 to 25 per cent of its length, the cutter bars being assembled with their convex faces facing each other, said curvatures being straightened out in the assembled hedge trimmer.

5. In the combination of claim 1, means for limiting the sliding movement of one of said cutter bars relative to the other of said cutter bars.

6. In the combination of claim 5, said means comprising a projection on at least one of said operating levers and stops on at least one of said cutter bars.

7. In the combination of claim 5, said means comprising a nib on at least one of said cutter bars, said nib being adapted to engage said tab means on the other of said cutter bars.

References Cited in the file of this patent
UNITED STATES PATENTS

| | | |
|---|---|---|
| 379,881 | Voss | Mar. 20, 1888 |
| 736,854 | Long | Aug. 15, 1903 |
| 1,494,336 | Bowman | May 20, 1924 |
| 1,789,370 | Nylander | Jan. 20, 1931 |
| 2,566,492 | Howell | Sept. 4, 1951 |